(12) United States Patent
Kalyanpur et al.

(10) Patent No.: US 9,910,844 B2
(45) Date of Patent: *Mar. 6, 2018

(54) ENTITY-RELATION BASED PASSAGE SCORING IN A QUESTION ANSWERING COMPUTER SYSTEM

(71) Applicant: International Business Machines Corporation, Armonk, NY (US)

(72) Inventors: Aditya A. Kalyanpur, Westwood, NY (US); James W. Murdock, IV, Amawalk, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 255 days.

This patent is subject to a terminal disclaimer.

(21) Appl. No.: 14/644,423

(22) Filed: Mar. 11, 2015

(65) Prior Publication Data

US 2016/0147763 A1    May 26, 2016

Related U.S. Application Data

(63) Continuation of application No. 14/548,359, filed on Nov. 20, 2014.

(51) Int. Cl.
*G06F 17/30* (2006.01)
*G06F 17/27* (2006.01)

(52) U.S. Cl.
CPC ........ *G06F 17/2705* (2013.01); *G06F 17/271* (2013.01); *G06F 17/277* (2013.01);
(Continued)

(58) Field of Classification Search
CPC .. G06F 17/2705; G06F 17/271; G06F 17/277; G06F 17/3043; G06F 17/30604; G06F 17/30654; G06F 17/30684
See application file for complete search history.

(56) References Cited

U.S. PATENT DOCUMENTS 9,201,927 B1* 12/2015 Zhang ................... G06F 17/271
2004/0221235 A1* 11/2004 Marchisio ............. G06F 17/271
                                                                715/261
(Continued)

OTHER PUBLICATIONS

Bach et al., (2007), A review of relation extraction, Literature review for Language and Statistics II.*
(Continued)

*Primary Examiner* — Jay Morrison
(74) *Attorney, Agent, or Firm* — Cantor Colburn LLP; William Stock

(57) ABSTRACT

According to an aspect, a query and a passage are parsed by a language parser to detect noun-centric phrases and verb-centric phrases in the query and the passage. Entities, including at least one untyped entity, are identified based on the noun-centric phrases and relations are identified based on the verb-centric phrases. Entity pairs are created that include an entity identified in the query and an entity identified in the passage, each pair satisfies a matching criteria. Relation pairs are created that include a relation identified in the query and a relation identified in the passage, each pair satisfies a matching criteria. A passage score that indicates the likelihood that an answer to the query is contained in the passage is determined based on the entity pairs, the matching criteria satisfied by each entity pair, the elation pairs, and the matching criteria satisfied by each relation pair.

8 Claims, 5 Drawing Sheets

(52) U.S. Cl.
CPC .... *G06F 17/3043* (2013.01); *G06F 17/30604* (2013.01); *G06F 17/30654* (2013.01); *G06F 17/30684* (2013.01)

(56) References Cited

U.S. PATENT DOCUMENTS

| | | | | |
|---|---|---|---|---|
| 2007/0179776 A1* | 8/2007 | Segond | ............... | G06F 17/2247 704/9 |
| 2009/0287678 A1* | 11/2009 | Brown | .............. | G06F 17/30654 |
| 2011/0125734 A1* | 5/2011 | Duboue | ................... | G09B 7/00 707/723 |
| 2016/0042058 A1* | 2/2016 | Nguyen | ............ | G06F 17/30684 707/771 |

OTHER PUBLICATIONS

Mintz et al., "Distant supervision for relation extraction without labeled data," Proceedings of the Joint Conference of the 47th Annual Meeting of the ACL and the 4th International Joint Conference on Natural Language Processing of the AFNLP: vol. 2, Association for Computational Linguistics, 2009.*

Aditya A. Kalyanpur et al., Pending U.S. Appl. No. 14/548,359 entitled "Entity-Relation Based Passage Scoring in a Question Answering Computer System," filed with the U.S. PTO Nov. 20, 2014.

List of IBM Patents or Patent Applictions Treated as Related; (Appendix P), Filed Mar. 11, 2015, 2 pages.

\* cited by examiner

ENTITY-RELATION BASED PASSAGE SCORING IN A QUESTION ANSWERING COMPUTER SYSTEM

DOMESTIC PRIORITY

This application is a continuation of U.S. patent application Ser. No. 14/548,359, filed Nov. 20, 2015, the content of which is incorporated by reference herein in its entirety.

BACKGROUND

The present disclosure relates generally to a question answering computer system, and more specifically, to entity-relation (ER) based passage scoring in a question answering computer system.

An information retrieval computer system typically receives a query, identifies keywords in the query, searches documents for the keywords, and ranks results of the searching to identify best matches. Some information retrieval computer systems output a list of best matching results to a user, such that the user can then attempt to determine if desired information can be found in the results. Keyword searching often uses frequency-based scoring for words or synonyms, but such searches typically fail to consider the context of particular words. More advanced question answering computer systems typically employ natural-language processing (NLP) that returns a highest scoring answer to a question in a natural language format. NLP techniques, which are also referred to as text analytics, infer the meaning of terms and phrases by analyzing their syntax, context, and usage patterns.

Human language is so complex, variable (there are many different ways to express the same meaning), and polysemous (the same word or phrase may mean many things in different contexts) that NLP presents an enormous technical challenge. Decades of research have led to many specialized techniques each operating on language at different levels and on different isolated aspects of the language understanding task. These techniques include, for example, shallow parsing, deep parsing, information extraction, word-sense disambiguation, latent semantic analysis, textual entailment, and co-reference resolution. None of these techniques is perfect or complete in their ability to decipher the intended meaning. Unlike programming languages, human languages are not formal mathematical constructs. Given the highly contextual and implicit nature of language, humans themselves often disagree about the intended meaning of any given expression.

Detecting semantic relations in text is very useful in both information retrieval and question answering because it enables knowledge bases (KBs) to be leveraged to score passages and retrieve candidate answers. Approaches for extracting semantic relations from text include exploitation of statistics about co-occurrences of terms, usage of patterns and rules, usage of different features (such as lexical, syntactic, semantic and contextual) to train machine learning (ML) classifiers, various kernel based ML approaches and hybrid approaches that combine multiple ML based approaches.

A question answering computer system can use a primary search to retrieve documents, passages and other types of information (from both structured, e.g., a KB, and unstructured sources), with respect to a query formulated from a given question, which are later used for candidate answer generation. Candidate answers can then be evaluated with respect to candidate passage evidence that supports or refutes the candidate answer. The objective of supporting evidence retrieval is to retrieve candidate passages with respect to a query formulated from the question plus the candidate answer. Just a minor fraction of the collected passages exhibit evidence that is actually useful to justify the answer, therefore a critical capability of a question answering computer system is to decide whether it is worthwhile to consider a passage for generating evidence. The task of identifying which of the retrieved passages are actually providing useful information to answer the question is also known as passage justification. Passage scorers use various techniques to judge a candidate passage, including methods based on surface similarity (i.e. textual alignment) with the question, logical form alignment, structural similarity based on syntactic-semantic graphs, various linguistic features, etc.

SUMMARY

Embodiments include a method for entity-relation (ER) based passage scoring in a question answering computer system. In one aspect, a method includes parsing, by a language parser, a query and a passage to detect noun-centric phrases and verb-centric phrases in the query and the passage. Entities are identified, for both of the query and the passage, based on the noun-centric phrases detected from the parsing. The entities include at least one untyped entity. Relations are identified, for both of the query and the passage, based on the verb-centric phrases detected from the parsing. One or more entity pairs are created, each entity pair including an entity identified in the query and an entity identified in the passage. Each entity pair satisfies matching criteria with respect to entities of the entity pair. One or more relation pairs are created, each relation pair including a relation identified in the query and a relation identified in the passage. Each relation pair satisfies matching criteria with respect to relations of the relation pair. A passage score that indicates the likelihood that an answer to the query is contained in the passage is determined by a question answering computer system. The determining of the passage score is based on the one or more entity pairs, the matching criteria satisfied by each entity pair, the one or more relation pairs, and the matching criteria satisfied by each relation pair.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments disclosed herein relate to entity-relation (ER) based passage scoring to determine the likelihood that a particular passage addresses the requirements of a given query. This type of analysis can be utilized by a computer system such as the Watson™ product from IBM to perform context dependent scoring, as well as by other question answering (QA) architectures and other applications such as, but not limited to, searching, textual data mining, text summarization, and document clustering. An embodiment of the ER based passage scoring described herein determines a relevance of a particular passage to a query (e.g. a question) by identifying entities and relations in both the query and the passage, and then by determining the degree to which the entities and relations match between the question and the passage.

Embodiments can identify both entities and relations that are "untyped", that is they don't need to conform to a type system or ontology. The identification of untyped entities and relations can be done using a combination of part-of-speech (POS) information (e.g., noun, verb, adjective, adverb, etc.) and dependency parse information (e.g., noun-modifiers, subjects-of-verb, objects-of-verb, etc.), both of which can be produced by standard language parsers.

Untyped entities typically correspond to, but are not limited to, noun-centric-phrases which are made up of a head noun and its relevant attached modifiers; while untyped relations typically correspond to, but are not limited to, verb-centric phrases which are made up of a central verb and its associated subjects, direct objects and indirect objects. The identification of entities and relations can be performed using a language parser to dynamically identify the scope of the text describing an entity (e.g., an untyped entity) as well as the scope of the text describing a relation between entities (e.g., an untyped relation). The identified entities and relations from a question can then be aligned or matched with the identified entities and relations from a passage in order to determine the likelihood that the passage contains an answer to the question.

Figure 1:
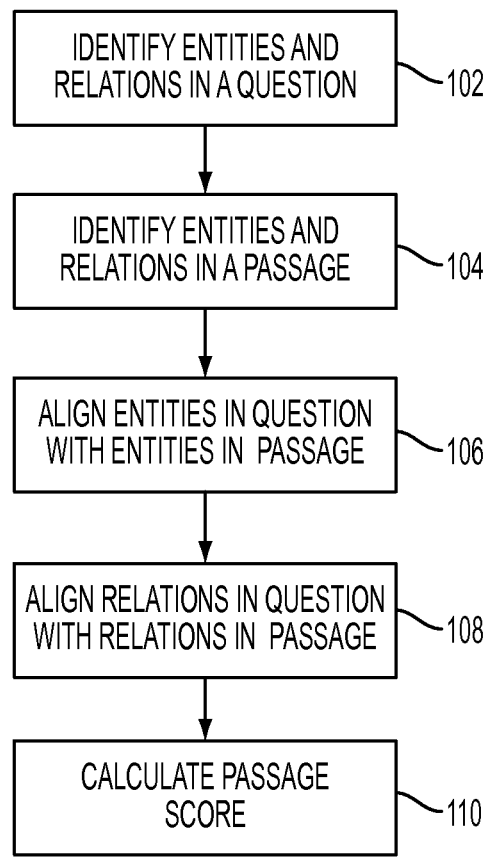
FIG. 1 depicts a process flow for entity-relation (ER) based passage scoring in accordance with an embodiment.

Turning now to FIG. 1, a process flow for ER based passage scoring is generally shown in accordance with an embodiment. The process flow shown in FIG. 1 is described using a simplified example to illustrate aspects of embodiments. Embodiments of ER based passage scoring are not limited to aspects shown in the example. Consider the following medical diagnosis question:

What kidney disease causes swelling around wrist and knee joints and is initially diagnosed by a urine test showing abnormal albumin?

The correct answer is "Kidney Amyloidosis."

Now consider the following passage containing the correct answer:

Kidney Amyloidosis leads to peripheral joint swelling, cysts in bones, and proteinuria.

Typical automated passage scoring techniques which use a bag-of-words (BOW) based similarity metric will not find much similarity between the passage and the question, as there are very few keywords in common (kidney, joint, and swelling). However, a human reading the passage would consider it as supplying good evidence for the candidate "Kidney Amyloidosis" to be a valid answer to the question. Moreover, with some background knowledge (e.g. knowing that "proteinuria" is a medical term for abnormal urine albumin), it could be concluded that the passage strongly justifies the answer. Embodiments of the ER based passage scoring technique go beyond the standard BOW approach and use a combination of syntactic and semantic knowledge to analyze the question and passage. A key underlying principle is the identification of untyped entities and relations, in both the question and the passage. The ER technique attempts to align, or match, these dynamically scoped (untyped) entities and relations found in the question with those in the passage.

Referring to FIG. 1 at block 102, entities and relations are identified in a question. In the above example, an embodiment of ER based passage scoring can use a language parser to detect the following untyped entities and relations:

Entities in Question:
QE1: kidney disease
QE2: swelling around wrist joint
QE3: swelling around knee joint
QE4: urine test
QE5: abnormal albumin Relations in Question (with Entity Arguments Shown in [ ]):
QR1: [kidney disease]-causes-[swelling around wrist joint]
QR2: [kidney disease]-causes-[swelling around knee joint]
QR3: [kidney disease]-is initially diagnosed by-[urine test]
QR4: [urine test]-showing-[abnormal albumin]

Note that the entities and relations detected above are not from any predefined ontology or knowledge base (KB). Moreover, both entities and relations are not limited to short words or terms, but can also include longer phrases (e.g. the entity: "swelling around wrist joint" or the relation: "is initially diagnosed by"). An embodiment of the process can detect these untyped entity and relations shown above dynamically by using a parser to analyze part-of-speech and dependency information.

Referring to FIG. 1 at block 104, entities and relations are identified in the passage. In the above example, an embodiment of ER based passage scoring can use a language parser to detect the following untyped entities and relations:

Entities in Passage:
PE1: Kidney Amyloidosis
PE2: peripheral joint swelling
PE3: cysts in bones
PE4: proteinuria Relations in Passage (with Entity Arguments Shown in [ ]):
PR1: [Kidney Amyloidosis]-leads to-[peripheral joint swelling]
PR2: [Kidney Amyloidosis]-leads to-[cysts in bones]
PR3: [Kidney Amyloidosis]-leads to-[proteinuria]

Having detected entities and relations in the question and passage, an embodiment of ER based passage scoring can attempt to match them using several algorithms and data resources. As shown at block 106 of FIG. 1, entities identified in the question are aligned with entities identified in the passage.

In the above example, an embodiment of ER based passage scoring can result in the following matches:
Entity Matching:

QE1-PE1 (since Kidney Amyloidosis is a type of kidney disease)
QE2-PE2 (since wrist joint is a type of peripheral joint)
QE3-PE2 (since knee joint is a type of peripheral joint)
QE5-PE4 (since proteinuria is the medical term for abnormal albumin in the urine)

The information to do the matching above can come from a variety of techniques such as statistical techniques (e.g. statistical similarity between "wrist" and "peripheral joint" from a large medical corpus) and/or from a KB technique (e.g. definition of "proteinuria" from a medical dictionary). The matching criteria met, or satisfied, by the entity pairs can include, but is not limited to: a degree of statistical similarity, that the matched entities are the same, that the matched entities are synonyms, and/or that that the matched entities have a relation in a KB. An entity match confidence score can be calculated based on a degree of sureness associated with the matching criteria (e.g., with entities that are the same having a higher confidence score than entities that are synonyms).

As shown at block 108 of FIG. 1, relations identified in the question are aligned with relations identified in the passage.

In the above example, an embodiment of ER based passage scoring can result in the following matches:
Relation Matching:
QR1-PR1 (since the phrases "cause" and "leads to" are similar in this context)
QR2-PR1 (since the phrases "cause" and "leads to" are similar in this context)

Note that the embodiment of ER based passage scoring shown above only matches relations when their corresponding entity arguments also match. As in the entity matching case, a variety of techniques can be used to match relation phrases. An embodiment of ER based passage scoring can use a latent semantic analysis (LSA) model and a thesaurus based similarity measure for matching relations. The matching criteria met, or satisfied, by the relation pairs can include, but is not limited to: a degree of statistical similarity, that the matched relations are the same, that the matched relations are synonyms, and/or that that the matched relations have a relation in a KB. A relation match confidence score can be calculated based on a degree of sureness associated with the matching criteria (e.g., with relations that are the same having a higher confidence score than relations that are synonyms).

The final passage score can be computed at block 110 based on information such as, but not limited to: the number of pairs, the type of match criteria met by each pair, and a sum of the entity and relation match confidence scores. In addition, different weights can be given to the entities and the relations. Note that all of the match scores can be real numbers, e.g., between 0 and 1, with a 0 indicating no match and a 1 indicating an exact match.

One advantage of an ER approach to passage scoring is that it is possible to infer new relations from the initial set of relations detected in the text by using additional background knowledge. For example, suppose the following rule is in a medical KB:
If disease D has diagnostic procedure P which reveals symptom S . . . then D causes symptom S
Applying this rule to the question, a new relation (QR5) can be inferred based on relations QR3 and QR4:
QR5: [kidney disease]-has symptom-[abnormal albumin in urine]
Based on this new information, the passage scorer can find an additional relation match in the passage:

QR5-PR3 (since both the entity arguments already match, and "causes symptom" and "leads to" are similar in this context)

As shown in this example, the process of incorporating additional inferences can lead to higher evidence matching scores.

Figure 2:
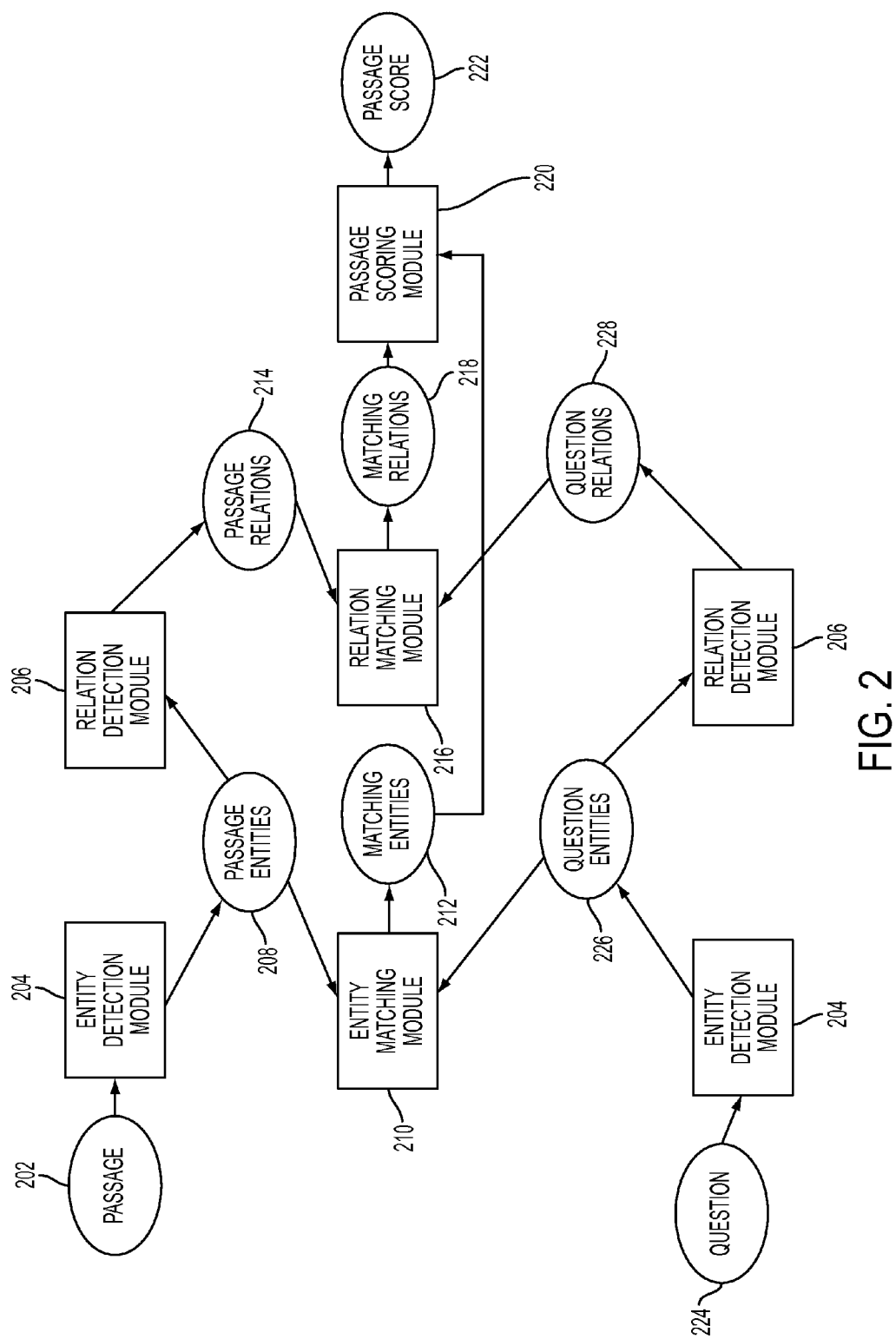
FIG. 2 depicts a block diagram of a dataflow for ER based passage scoring in accordance with an embodiment.

FIG. 2 depicts a block diagram of a dataflow for ER based passage scoring in accordance with an embodiment. Input to the dataflow shown in FIG. 2 is a question 224 and a candidate passage 202. Five main modules are shown in the embodiment in FIG. 2: an entity detection module 204; a relation detection module 206; an entity matching module 210; a relation matching module 216; and a passage scoring module 220.

In an embodiment, the entity detection module 204 can be implemented as a single module (receiving both the passage 202 and the question 224 as input), or as two separate modules as shown in FIG. 2 (with the same computer software and/or hardware, or with different computer software and/or hardware). In an embodiment, portions of the entity detection module 204 can be tailored to detecting entities in passages and other portions tailored to detecting entities in questions. One difference is that passages are typically longer pieces of text than the question, and may include semi-structured information such as section headings, lists, tables etc. which can benefit from specialized processing to detect entities.

The spans of one or more words in a text that are labeled as entities are typically nouns, often with one or more modifiers. They are not always singleton terms and they are not always complete noun phrases. Instead, they are a collection of terms that together define a specific class/instance in the ontological sense. For example, in an embodiment, "episodes of swelling", "pain in the leg", and "cardiovascular disease" are all considered entities, instead of "episode", "pain" and "disease" respectively (as those nouns can be too generic and/or don't make sense by themselves given the surrounding context). Similarly, some noun phrases may include too much detail and be too specific, e.g., "episodes of swelling that began a week earlier." Embodiments can use information from a parser such as, but not limited to, "chunk-information", presence of edges such as "mod_noun", and the inverse document frequency (IDF) of a noun to determine when to expand/include nearby modifiers (including post modifiers linked via preposition). The central noun in the entity which is expanded to include nearby modifiers can be referred to as the "head." In the examples above, "episode", "pain" and "disease" are all considered the head nouns of the entity.

Figure 3:
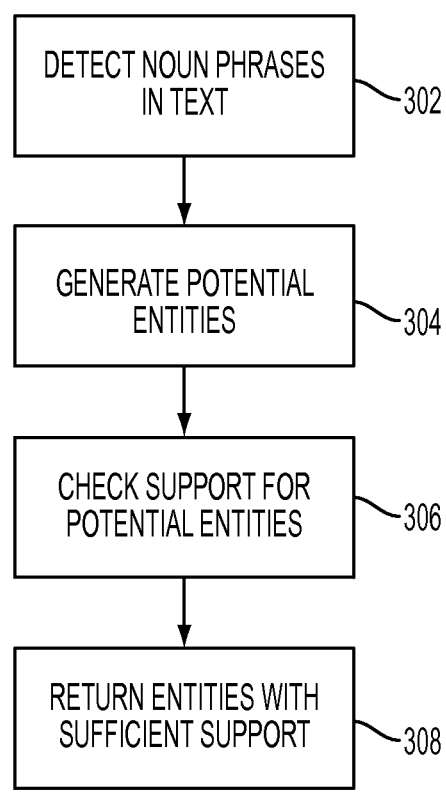
FIG. 3 depicts a process flow for entity detection in accordance with an embodiment.

In an embodiment, entity detection is performed by entity detection module 204 using a process flow such as that shown in FIG. 3. Text, which can include the passage 202 (e.g., a sentence, two or more sentences, a document, etc.) and the question 224, is input to the entity detection process. At block 302, noun phrases that are found by a dependency parser (e.g., an English slot grammar or "ESG" parser) are detected. At block 304, potential entities can be generated by, for example, merging adjacent/contiguous nouns in the text (e.g., "wrist joint"), using parse analysis to attach adjective modifiers when the head noun is common ("urine test"), and using parse analysis to attach prepositional phrases when the head noun is common (e.g., "swelling around wrist joint"). In an alternate embodiment, the potential entities detected at block 304 are output as the identified entities. In the embodiment shown in FIG. 3, processing continues at block 306 where the entity detection uses background resources to check for support for the potential entities. These background resources can include, for example: an N-gram corpus of the domain (e.g., to check frequency of entity mentions); a Prismatic KB (e.g., to check frequency of parse-frames); and a domain dictionary/KB (e.g., to check if an entity is a concept in a medical dictionary). At block 308, entities (e.g., passage entities 208 and question entities 226) with sufficient support in the background knowledge are output along with a score that reflects the confidence in the detection technique. The confidence scoring is typically done by a machine learning based classifier that learns how to combine the different support information appropriately using a pre-compiled training set.

Referring back to FIG. 2, the passage entities 208 and question entities 226 that are output from the entity detection module 204 are input to a relation detection module 206. In an embodiment, the relation detection module 206 can be implemented as a single module (receiving both the passage entities 208 and the question entities 226 as input), or as two separate modules as shown in FIG. 2 (with the same computer software and/or hardware, or with different computer software and/or hardware). In an embodiment, portions of the relation detection module 206 can be tailored to detecting relations in passages and other portions tailored to detecting relations in questions. One difference is that passages are typically longer pieces of text than the question, and may include semi-structured information such as section headings, lists, tables etc. which can benefit from specialized processing to detect relations.

In an embodiment, relation detection module 206 includes two sub-modules: an explicit relation detection module and an inferred relation detection module. In an embodiment, entities output from the entity detection module 204 (e.g., passage entities 208 and/or question entities 226) are input to the explicit relation detection module. An embodiment of the explicit relation detection module receives entities as input and performs the following: find dependency path linking the input entities in the text; check dependency path (which is the shortest path in the parse tree of the sentence that links the two entities) for verbs (typically denote relations) and prepositions (denote relations in certain contexts and can be determined statistically by analyzing the domain); and return relations based on the context-specific verb/prepositions found in the path. These explicit relations found between the input entities (if any) are output (e.g., as passage relations 214 and/or as question relations 228). An embodiment of the inferred relation detection module receives the explicit relations (if any) and looks for new inferred relations using, for example, KB and statistical rules to infer new relations. These inferred relations are included, along with the explicit relations in the relations (e.g., passage relations 214 and/or question relations 228) that are output from the relation detection module 206.

In an embodiment, relations are binary between a pair of entities. A relation between two entities can be detected by looking at the dependency path between the heads of the two entities, and looking for the presence of cuts which conceptually express relations (e.g., subject-verb-object or "SVO", subject-verb-predicate-object or "SVPO", object-verb-complement or "OVC", etc.). Embodiments expand on Prismatic cuts which are very local and only one-step deep. For example, when considering SVO, Prismatic looks only for the exact pattern SVO with nothing else in between (the subject and the verb, or the verb and the object) and this can be restrictive. In contrast, when considering SVO, embodiments of ER based passage scoring can search for a subject link anywhere in the dependency path from the head of one entity to the root-verb, and an object link anywhere in the path from the head of the other entity to the root verb, with no depth restriction. As a result, embodiments produce relations having larger coverage than the basic Prismatic cuts.

Entities and relations can be given a weight or score which can be determined from the inverse document frequency (IDF) of their terms. Additionally, relations can be associated with a confidence score as relation detection can be more likely to be faulty than entity detection. Typically, machine-learning based classifiers are used to detect relations in text.

Referring to FIG. 2, the entity matching module 210 receives, as input, question entities 226 and passage entities 208. The entity matching module 210 can use a combination of term matchers such as, but not limited to: exact match, synonym match (e.g., dictionary/thesaurus based), and statistical similarity using LSA to generate pairs of matching entities 212, with a score for each pair indicating the degree of match. Typically, a machine-learning based classifier is used to learn how to combine the individual term matching information into an aggregate matching confidence score. In an embodiment, entity matching can consider all the terms in an entity, with each term weighted by IDF. Terms can be matched by checking to see if their raw text is the same, checking to see if the lemma form of their text is the same, or by using any of a wide variety of term matching algorithms based on dictionaries and/or semantic similarity.

Referring to FIG. 2, the relation matching module 216 receives as input passage relations 214 and question relations 228. The relation matching module 216 can use a combination of term matchers such as, but not limited to: exact match, synonym match (e.g., dictionary/thesaurus based), and statistical similarity using LSA to generate pairs of matching relations 218 along with a score for each pair indicating the degree of match. Typically, a machine-learning based classifier is used to learn how to combine the individual relation matching information into an aggregate matching confidence score. In an embodiment, the relation matching module 216 can compare the text in the dependency path of two relations and terms in the raw dependency path are expanded to include verb modifiers (e.g. " . . . do not . . . " where only "do" appears in the dependency path). Matching can be done using LSA and a subsequence-kernel that uses a Thesaurus to compute similarities of individual sub-sequences.

In an embodiment, mismatches can be computed at both the entity level (e.g., by the entity matching module 210) and the relation level (e.g., by the relation matching module 216). Mismatch information can come from negation detection and from antonym information in a Thesaurus. If part of a relation (or entity) has a mismatch, it is considered whether the rest of the relation (or entity) matched above a certain threshold for there to be an overall mismatch. For example, if relation 1 is "more likely to cause" and relation 2 is "less likely to cause", a mismatch is detected between "more" and "less" and match is detected between the remaining terms "likely to cause." The result can be the assignment of an overall mismatch score. Mismatches can be used to prevent false positives (e.g., between "more likely to cause" and "less likely to cause").

Referring to FIG. 2, the passage scoring module 220 receives the matching relations 218 and the matching entities as input and outputs a passage score 222 (e.g., between zero and one) that indicates how well the passage 202 answers the question 224.

An embodiment of the passage scoring module 220 takes into account (indirectly or directly) the scores previously generated by the entity detection module 204, the relation detection module 206, the entity matching module 210, and the relation matching module 216. As described previously, in an embodiment, the entity detection module 204 is executed on the question 224 to detect question entities 226 (QE1 . . . QEn) (each with associated confidence score) and executed on the passage 101 to detect passage entities 208 (PE1 . . . PEn) (each with associated confidence score). In addition, the relation detection module 206 (which includes explicit and inferred relation detection modules) is executed on the question entities 226 (QE1 . . . QEn) to detect question relations 228 in the question 224 (QR1 . . . QRn) (each associated with confidence score) and executed on the passage entities 208 (PE1 . . . PEn) to detect passage relations 214 in the passage 202 (PR1 . . . PRn) (each associated with confidence score).

The entity matching module 210 matches the question entities 226 (QE1 . . . n) to the passage entities 208 (PE1 . . . n) considering, for example, entity detection confidences and the confidence of the matching algorithm. The relation matching module 216 matches question relations 228 (QR1 . . . n) to the passage relations 214 (PR1 . . . n) considering, for example, relation detection confidences, entity argument matching confidences, and the confidence of the matching algorithm.

In an embodiment, the passage scoring module 220 computes the final matching score, or the passage score 222, based on the matching entities 212 (and associated confidence levels) and the matching relations 218 (and associated confidence levels). In an embodiment, the confidence levels associated with the matching entities 212 and the matching relations are aggregated to calculate the passage score 222. The most basic score computation can involve constructing a common match graph, where the nodes are matching entity-pairs, and the edges are matching relation-pairs, and then taking the sum of match scores for each node/edge in this graph.

In an embodiment the passage scoring module 220 can compute a focus-centered sub-graph match between the question 224 and the passage 202 as used in a logical form answer candidate scorer (LFACS).

An embodiment of the passage scoring module 220 can compute a match score and a mismatch score separately. Mismatch for a relation can be computed by considering entity mismatches for relation arguments and mismatches for a relation dependency path. The match/mismatch scores can be normalized between zero and one.

Figure 4:
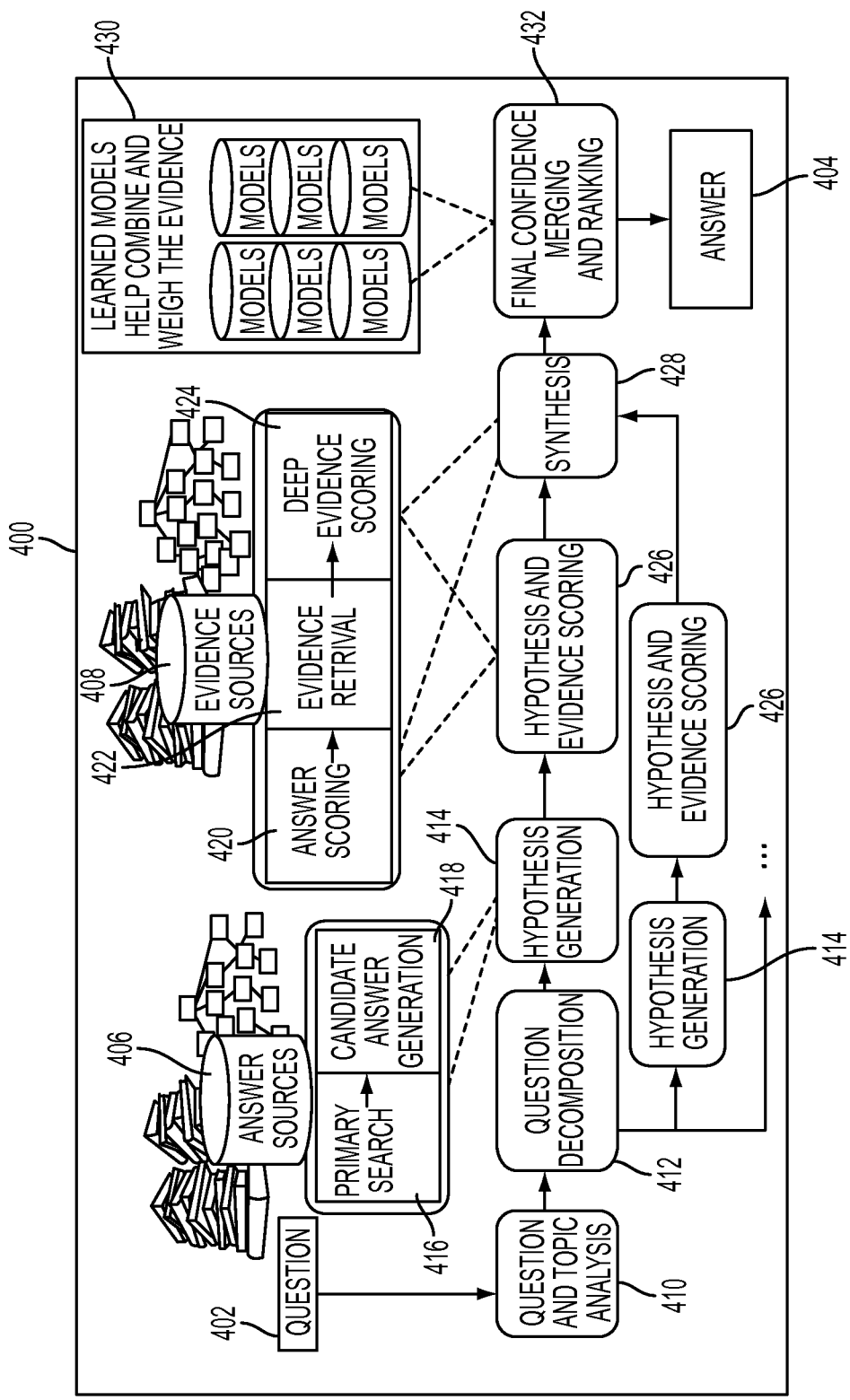
FIG. 4 depicts a high-level block diagram of a question-answer (QA) framework where embodiments of ER based passage scoring can be implemented in accordance with an embodiment.

Turning now to FIG. 4, a high-level block diagram of a question-answer (QA) framework 400 where embodiments described herein can be utilized is generally shown.

In a Watson™/DeepQA pipeline, the ER based passage scoring can be used by an evidence scoring module (e.g., deep evidence scoring 424, hypothesis and evidence scoring 426, etc.). In particular, embodiments of the ER based passage scoring can be part of a context dependent scoring (CDS) sub-system, where the context can be a textual passage that contains the candidate answer to the question. In such cases (where the context is a passage), the CDS module can be referred to as a "passage scorer." The task of the passage scorer is to determine to what extent the passage (containing the candidate answer) justifies or answers the whole question. Examples of passage scoring algorithms used by Watson™ include passage-term-match, skip-big-ram, textual-alignment, and LFACS.

Referring now to FIG. 4, the QA framework 400 can be implemented to generate a ranked list of answers 404 (and a confidence level associated with each answer) to a given question 402. In an embodiment, general principles implemented by the framework 400 to generate answers 404 to questions 402 include massive parallelism, the use of many experts, pervasive confidence estimation, and the integration of shallow and deep knowledge. In an embodiment, the QA framework 400 shown in FIG. 4 is implemented by the Watson™ product from IBM.

The QA framework 400 shown in FIG. 4 defines various stages of analysis in a processing pipeline. In an embodiment, each stage admits multiple implementations that can produce alternative results. At each stage, alternatives can be independently pursued as part of a massively parallel computation. Embodiments of the framework 400 don't assume that any component perfectly understands the question 402 and can just look up the right answer 404 in a database. Rather, many candidate answers can be proposed by searching many different resources, on the basis of different interpretations of the question (e.g., based on a category of the question.) A commitment to any one answer is deferred while more and more evidence is gathered and analyzed for each answer and each alternative path through the system.

As shown in FIG. 4, the question and topic analysis 410 is performed and used in question decomposition 412. Hypotheses are generated by the hypothesis generation block 414 which uses input from the question decomposition 412, as well as data obtained via a primary search 416 through the answer sources 406 and candidate answer generation 418 to generate several hypotheses. Hypothesis and evidence scoring 426 is then performed for each hypothesis using evidence sources 408 and can include answer scoring 420, evidence retrieval 422 and deep evidence scoring 424.

A synthesis 428 is performed of the results of the multiple hypothesis and evidence scorings 426. Input to the synthesis 428 can include answer scoring 420, evidence retrieval 422, and deep evidence scoring 424. Learned models 430 can then be applied to the results of the synthesis 428 to generate a final confidence merging and ranking 432. A ranked list of answers 404 (and a confidence level associated with each answer) is then output.

Figure 5:
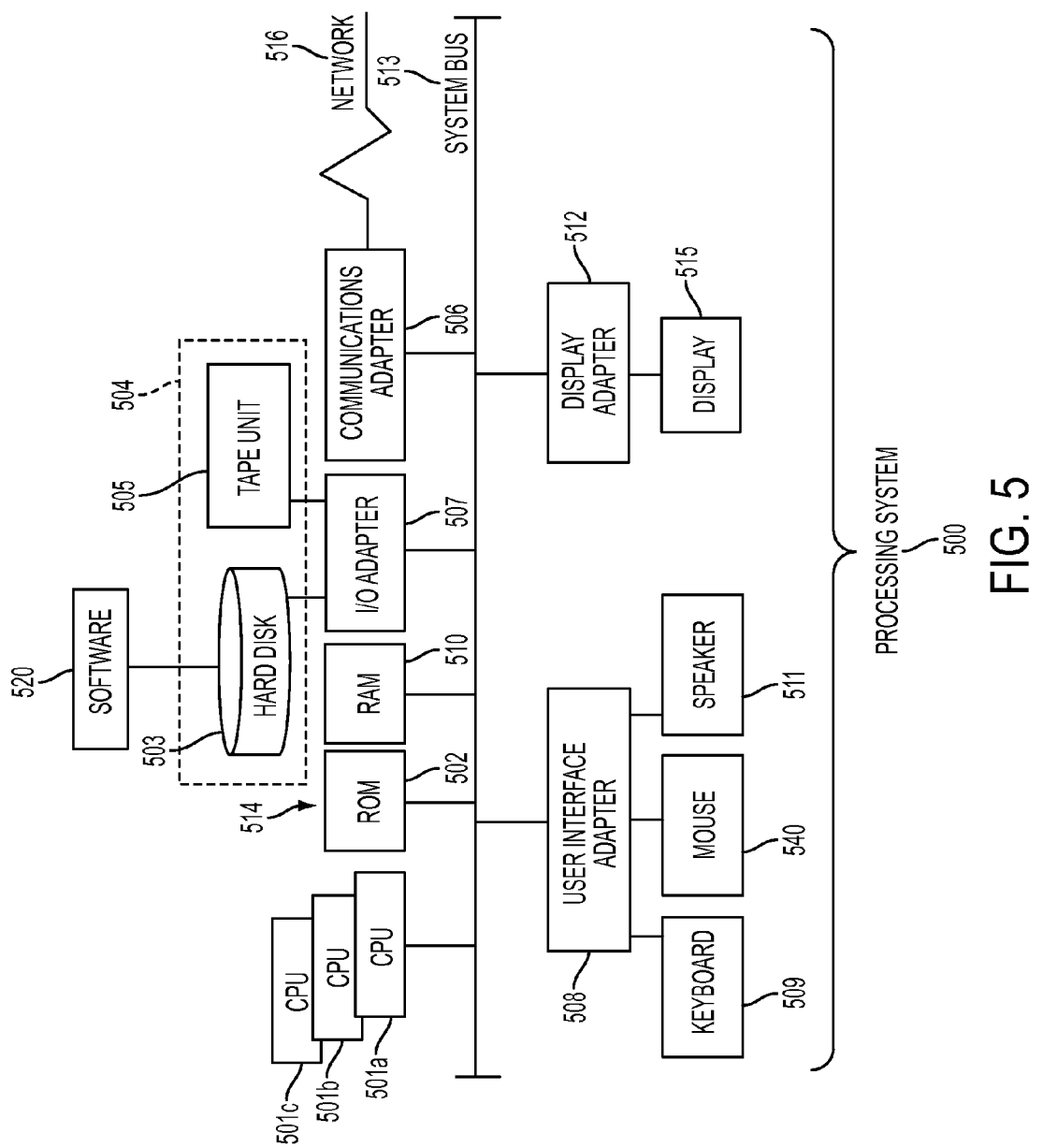
FIG. 5 depicts a processing system in accordance with an embodiment.

Referring now to FIG. 5, there is shown an embodiment of a processing system 500 for implementing the teachings herein. The processing system 500 is an example of a question answering computer system as previously referenced herein. In this embodiment, the processing system 500 has one or more central processing units (processors) 501a, 501b, 501c, etc. (collectively or generically referred to as processor(s) 501). Processors 501, also referred to as processing circuits, are coupled to system memory 514 and various other components via a system bus 513. Read only memory (ROM) 502 is coupled to system bus 513 and may include a basic input/output system (BIOS), which controls certain basic functions of the processing system 500. The system memory 514 can include ROM 502 and random access memory (RAM) 510, which is read-write memory coupled to system bus 513 for use by processors 501.

FIG. 5 further depicts an input/output (I/O) adapter 507 and a network adapter 506 coupled to the system bus 513. I/O adapter 507 may be a small computer system interface (SCSI) adapter that communicates with a hard disk 503 and/or tape storage drive 505 or any other similar component. I/O adapter 507, hard disk 503, and tape storage drive 505 are collectively referred to herein as mass storage 504. Software 520 for execution on processing system 500 may be stored in mass storage 504. The mass storage 504 is an example of a tangible storage medium readable by the processors 501, where the software 520 is stored as instructions for execution by the processors 501 to perform a method, such as the process flows of FIG. 1 and FIG. 3. Network adapter 506 interconnects system bus 513 with an outside network 516 enabling processing system 500 to communicate with other such systems. A screen (e.g., a display monitor) 515 is connected to system bus 513 by display adapter 512, which may include a graphics controller to improve the performance of graphics intensive applications and a video controller. In one embodiment, adapters 507, 506, and 512 may be connected to one or more I/O buses that are connected to system bus 513 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 513 via user interface adapter 508 and display adapter 512. A keyboard 509, mouse 540, and speaker 511 can be interconnected to system bus 513 via user interface adapter 508, which may include, for example, a Super I/O chip integrating multiple device adapters into a single integrated circuit.

Thus, as configured in FIG. 5, processing system 500 includes processing capability in the form of processors 501, and, storage capability including system memory 514 and mass storage 504, input means such as keyboard 509 and mouse 540, and output capability including speaker 511 and display 515. In one embodiment, a portion of system memory 514 and mass storage 504 collectively store an operating system such as the AIX® operating system from IBM Corporation to coordinate the functions of the various components shown in FIG. 5.

Technical effects and benefits include the ability to increase processing efficiency and reduce latency of evidence scoring in a question answering computer system by broadening entities and relations to include those that are untyped.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   parsing, by a language parser, a query and a passage to detect noun-centric phrases and verb-centric phrases in the query and the passage;
   identifying entities, for both of the query and the passage, based on the noun-centric phrases detected from the parsing, the entities from each of the query and the passage including at least one untyped entity that includes a noun and at least one modifier;
   identifying relations, for both of the query and the passage, based on the verb-centric phrases detected from the parsing;
   creating one or more entity pairs that each include an entity identified in the query and an entity identified in the passage, each entity pair satisfying a matching criteria with respect to entities of the entity pair and at least one entity pair including an untyped entity identified in the query and an untyped entity identified in the passage, the matching criteria with respect to entities of the entity pair including a degree of statistical similarity between the entities of the entity pair;
   creating one or more relation pairs that each include a relation identified in the query and a relation identified in the passage, each relation pair satisfying a matching criteria with respect to relations of the relation pair;
   calculating, by a question answering computer system, for each of the entity pairs, an entity match confidence score that indicates a level of confidence that the entities of the entity pair match; and
   determining, by the question answering computer system, a passage score for the passage that indicates a likelihood that an answer to the query is contained in the passage, the determining based on the one or more entity pairs, the matching criteria satisfied by each entity pair, the one or more relation pairs, the matching criteria satisfied by each relation pair, and the one or more of the entity match confidence scores,
   wherein the passage score is accessible to a computer system for determining a relevance of the passage to the query, the query received from an agent external to the computer system.

2. The method of claim 1, further comprising:
   calculating, by the question answering computer system, for each of the relation pairs, a relation match confidence score that indicates a level of confidence that the relations of the relation pair match,
   wherein the determining is further based on the one or more relation match confidence scores.

3. The method of claim 1, wherein at least one of the relations is an untyped relation.

4. The method of claim 1, wherein the language parser includes a part-of-speech parser and a dependency parser.

5. The method of claim 1, wherein the identifying of at least one of the relations is further based on an inference using a rule obtained from a knowledge base.

6. The method of claim 1, wherein each entity includes one or more terms.

7. The method of claim 1, wherein the statistical similarity is based on at least one of whether the entity identified in the query is the same as the entity identified in the passage, whether the entity identified in the query is a synonym of the entity identified in the passage, and whether the entity identified in the query is determined by latent semantic analysis (LSA) to be statistically similar to the entity identified in the passage.

8. The method of claim 1, wherein the matching criteria with respect to relations of the relation pair includes at least one of the relation identified in the query is the same as the relation identified in the passage, the relation identified in the query is a synonym of the relation identified in the passage, and the relation identified in the query is determined by LSA to be statistically similar to the relation identified in the passage.

\* \* \* \* \*